United States Patent
Culshaw et al.

(10) Patent No.: US 9,448,811 B2
(45) Date of Patent: Sep. 20, 2016

(54) MICROPROCESSOR DEVICE, AND METHOD OF MANAGING RESET EVENTS THEREFOR

(75) Inventors: Carl Culshaw, Wigan (GB); Thomas Luedeke, Oberbergkirchen (DE); Nicolas Grossier, Oreno di Vimercate (IT)

(73) Assignees: Freescale Semiconductor, Inc., Austin, TX (US); STMicroelectronics SRL, Agrate Brianza (IT)

( * ) Notice: Subject to any disclaimer, the term of this patent is extended or adjusted under 35 U.S.C. 154(b) by 126 days.

(21) Appl. No.: 14/354,005

(22) PCT Filed: Nov. 23, 2011

(86) PCT No.: PCT/IB2011/055259
§ 371 (c)(1),
(2), (4) Date: Apr. 24, 2014

(87) PCT Pub. No.: WO2013/076530
PCT Pub. Date: May 30, 2013

(65) Prior Publication Data
US 2014/0298005 A1    Oct. 2, 2014

(51) Int. Cl.
| | | |
|---|---|---|
| G06F 1/24 | (2006.01) | |
| G06F 9/44 | (2006.01) | |
| G06F 9/445 | (2006.01) | |
| G06F 11/07 | (2006.01) | |

(52) U.S. Cl.
CPC .............. *G06F 9/442* (2013.01); *G06F 1/24* (2013.01); *G06F 9/44505* (2013.01); *G06F 11/076* (2013.01); *G06F 11/0721* (2013.01)

(58) Field of Classification Search
CPC .... G06F 1/24; G06F 11/076; G06F 11/0757; G06F 11/0724
See application file for complete search history.

(56) References Cited

U.S. PATENT DOCUMENTS

| | | | | |
|---|---|---|---|---|
| 5,159,217 A * | 10/1992 | Mortensen | ............. | H03K 17/22 327/143 |
| 5,442,310 A * | 8/1995 | Bazes | .................... | H03K 17/22 327/143 |
| 5,454,114 A * | 9/1995 | Yach | ......................... | G06F 1/24 700/1 |
| 5,528,749 A | 6/1996 | Landis et al. | | |
| 5,638,510 A * | 6/1997 | Ishikawa | ............. | G06F 11/0757 714/51 |
| 5,717,907 A * | 2/1998 | Kuddes | ...................... | G06F 1/24 713/340 |
| 5,860,125 A * | 1/1999 | Reents | ...................... | G06F 1/24 365/227 |
| 6,188,256 B1 * | 2/2001 | Birns | ........................ | G06F 1/24 327/142 |
| 6,393,590 B1 * | 5/2002 | Wood | .................. | G06F 11/0724 710/104 |

(Continued)

FOREIGN PATENT DOCUMENTS

| | | |
|---|---|---|
| WO | 2013076591 A1 | 5/2013 |
| WO | WO2013076530 A1 | 5/2013 |

OTHER PUBLICATIONS

International Search Report and Written Opinion correlating to PCT/IB2012/050901 dated Oct. 16, 2012.

(Continued)

*Primary Examiner* — Jaweed A Abbaszadeh
*Assistant Examiner* — Gary Collins

(57) ABSTRACT

A microprocessor device comprises at least one reset management module. The at least one reset management module is arranged to detect a reset event comprising a first reset level, determine if at least one reset condition has been met upon detection of the reset event comprising the first reset level, and cause a reset of a second reset level upon determining that the at least one reset condition has been met.

20 Claims, 4 Drawing Sheets

(56) References Cited

U.S. PATENT DOCUMENTS

| | | | |
|---|---|---|---|
| 6,453,430 B1 | 9/2002 | Singh et al. | |
| 6,463,529 B1* | 10/2002 | Miller | G06F 1/24 713/2 |
| 6,557,108 B1* | 4/2003 | Moore | G06F 1/24 709/200 |
| 8,473,717 B2* | 6/2013 | Hugosson | G06F 12/08 712/34 |
| 2002/0184574 A1 | 12/2002 | Mackey et al. | |
| 2003/0037172 A1 | 2/2003 | Lacombe et al. | |
| 2004/0095116 A1* | 5/2004 | Kernahan | G06F 1/24 323/282 |
| 2004/0225831 A1* | 11/2004 | Pail | G06F 11/073 711/105 |
| 2005/0105348 A1* | 5/2005 | Tanaka | G06F 1/24 365/200 |
| 2005/0210179 A1* | 9/2005 | Walmsley | B41J 2/04505 711/3 |
| 2005/0273585 A1* | 12/2005 | Leech | G06F 1/24 713/1 |
| 2007/0276939 A1* | 11/2007 | Funato | G06F 11/0712 709/224 |
| 2008/0155359 A1 | 6/2008 | Ginggen et al. | |
| 2008/0256374 A1 | 10/2008 | Harris et al. | |
| 2009/0037770 A1 | 2/2009 | Troppmann et al. | |
| 2009/0044050 A1 | 2/2009 | Maimone et al. | |
| 2009/0300312 A1 | 12/2009 | Handschuh et al. | |
| 2010/0199121 A1 | 8/2010 | Abts et al. | |
| 2010/0306518 A1 | 12/2010 | Suryawanshi | |
| 2011/0022878 A1 | 1/2011 | Richards et al. | |
| 2011/0179255 A1* | 7/2011 | Pathirane | G06F 1/24 712/207 |
| 2011/0214006 A1 | 9/2011 | Meek et al. | |
| 2014/0223233 A1* | 8/2014 | Heyrman | G06F 11/1402 714/23 |

OTHER PUBLICATIONS

International Search Report and Written Opinion correlating to PCT/IB2011/055259 dated Jun. 29, 2012.

Non-Final Office Action mailed Nov. 23, 2015 for U.S. Appl. No. 14/353,999, 14 pages.

U.S. Appl. No. 14/353,999, Luedeke, T., "Microprocessor, and Method of Managing Reset Events Therefor", Final Office Action mailed May 19, 2016.

U.S. Appl. No. 14/353,999, Luedeke, T., "Microprocessor, and Method of Managing Reset Events Therefor", Final Office Action mailed Jul. 29, 2016.

* cited by examiner

US 9,448,811 B2

MICROPROCESSOR DEVICE, AND METHOD OF MANAGING RESET EVENTS THEREFOR

FIELD OF THE INVENTION

This invention relates to a microprocessor and a method of managing reset events therefor.

BACKGROUND OF THE INVENTION

In typical microcontroller devices, reset schemes are implemented whereby the microcontroller device will be reset upon a particular event occurring. In more intelligent systems, such a reset scheme may be divided into separate levels of reset, such as a destructive reset level and one or more functional reset levels. In a functional reset case only certain elements of the microcontroller device are reset, whilst in a destructive reset case a complete reset of the entire microcontroller device is performed. Accordingly, such a functional reset may typically be applied in response to non-critical reset events, whilst a destructive reset may be applied in response to a critical reset event. The limitation with strict implementations of separate functional and destructive resets is that reset events defined as a functional type will always generate a functional reset. However, in some cases it may be preferred that such a functional type of reset event be escalated to the destructive type in order to force a full system reset.

An example of a non-critical reset event is a system software watchdog reset event, which is typically handled as a functional reset event. However, depending on the system design it is sometimes preferable that this reset source is escalated to a destructive reset. For example, if the cause of the watchdog reset event is not removed by the functional reset, repeated software watchdog reset events may occur, resulting in reset cycling, which is typically not considered a safe state. Accordingly, escalating the reset to a destructive type in the event of such reset cycling in order to force a full system reset enables the microcontroller device to be returned to a (presumed) safe state.

SUMMARY OF THE INVENTION

The present invention provides a microprocessor and a method of managing reset events within a microprocessor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to a microprocessor device comprising one or more processing cores. For clarity, the term 'microprocessor device' used herein is intended to incorporate programmable microprocessor devices intended for use within general purpose applications, as well as programmable microprocessor devices intended for use within embedded applications, such as microcontroller devices and system on chip devices, and specialised programmable processing devices such as digital signal processor devices.

Figure 1:
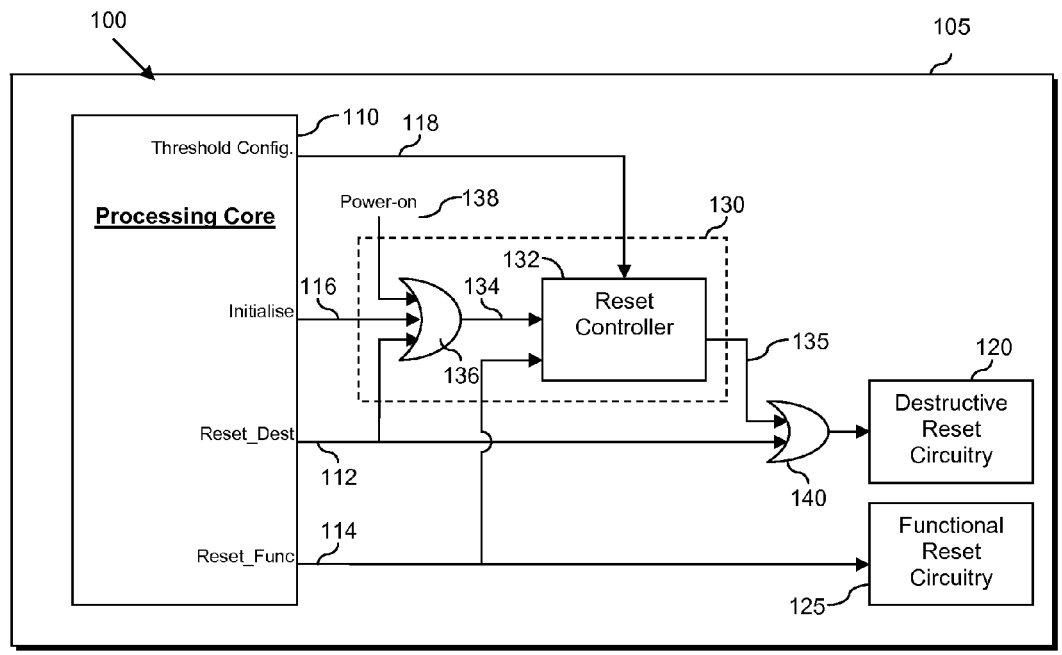
FIG. 1 illustrates a simplified block diagram of an example of a part of a microprocessor device.

Referring first to FIG. 1, there is illustrated a simplified block diagram of an example of a part of a microprocessor device 100 implemented as an integrated circuit device comprising at least one die within a single integrated circuit package 105. In the example illustrated in FIG. 1, the microprocessor device 100 comprises a minimum of a single processing core 110. However, it should be noted microprocessor device may comprise multiple cores, or that the processing core functionality is spread across multiple cores. The microprocessor device 100 further comprises reset circuitry 125 arranged to perform a first level reset and reset circuitry 120 arranged to perform a second level reset.

In the illustrated example, reset circuitry 120 comprises destructive reset circuitry arranged to receive a destructive reset signal 112 and to perform a 'destructive' reset of components within the microprocessor device 100, such as a complete reset of the entire microprocessor device 100, upon the destructive reset signal 112 indicating the detection of a destructive reset event.

Conversely, reset circuitry 125 comprises non-destructive reset circuitry arranged to receive a 'functional' reset signal 114 and to perform a functional reset of at least some components within the microprocessor device 100 upon the functional reset signal 114 indicating the detection of a functional (non-destructive) reset event. Thus, the destructive reset circuitry 120 is arranged to perform a more extensive reset and the functional reset circuitry 125 is arranged to perform a less extensive reset.

The microprocessor device 100 further comprises a reset management module 130. The reset management module 130 is arranged to detect a reset event comprising a first reset level, determine if at least one reset condition has been met upon detection of the reset event, and cause a reset of a second reset level upon determining that the at least one reset condition has been met. In particular for the example illustrated in FIG. 1, the reset management module 130 comprises a reset controller 132 arranged to receive the functional reset signal 114, and thereby to detect a functional reset event. The reset controller 132 is further arranged to output a destructive reset signal 135 to be received by the destructive reset circuitry 120. In the illustrated example, the destructive reset signals 112, 135 are provided to the destructive reset circuitry 120 via an OR gate 140. In this manner, if either of the destructive reset signals 112, 135 comprises, in the illustrated example, a '1' value (indicating that a destructive reset is to be performed) the destructive reset circuitry 120 will perform a destructive reset. It will be appreciated that there are multiple logical implementations for the administration of destructive reset signals, such as destructive reset signals 112, 135, and that the implementation illustrated in FIG. 1 comprising OR gate 140 is just one such example. Upon detection of a functional reset event, as indicated by the functional reset signal 114, the reset controller 132 illustrated in FIG. 1 is arranged to determine if at least one reset condition has been met, and if the reset condition(s) has/have been met, to output a '1' indicating to the destructive reset circuitry 120 that a destructive reset is required. In the manner, upon determining that the reset condition(s) has/have been met, the reset management module 130 is arranged to cause a destructive reset. Thus, the reset controller 132, and thereby the reset management module 130, is arranged to escalate a functional reset to a destructive reset upon the one or more reset conditions being met (for example as described in greater detail below).

Figure 2:
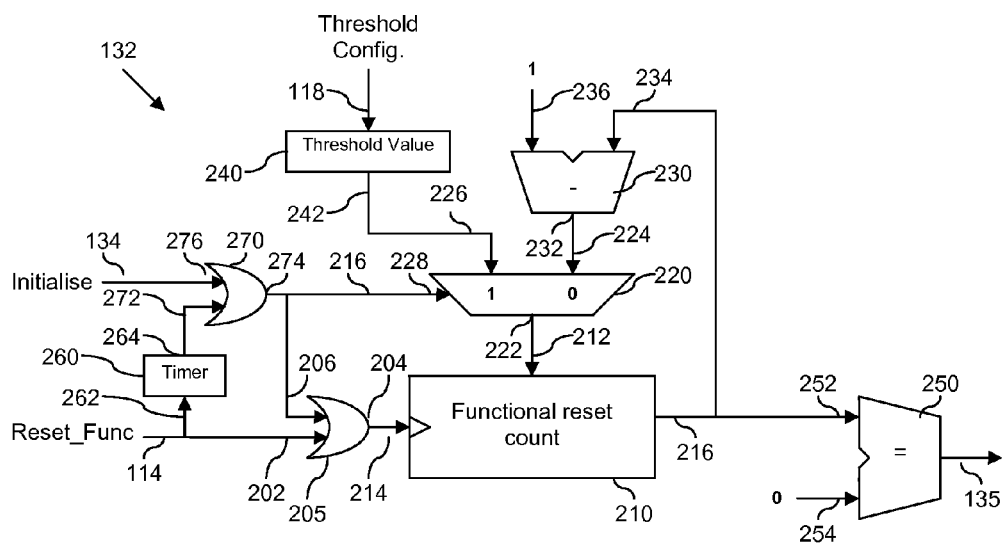
FIG. 2 illustrates a simplified block diagram of an example of the reset controller.

FIG. 2 illustrates a simplified block diagram of an example of the reset controller 132. In the example illustrated in FIG. 2, the reset controller 132 comprises a functional reset count element 210. The functional reset count element 210 is arranged to read and store a value received at a first input 212 thereof upon receipt of an active edge received at a second input 214 thereof. The functional reset count element 210 is further arranged to output 216 a currently stored value. The second input 214 of the functional reset count element 210 is arranged to receive the functional reset signal 114 (FIG. 1), and thus is arranged to read and store a value received at the first input 212 thereof upon an active edge of the functional reset signal 114; i.e. upon detection of a functional reset event. In the illustrated example, the second input 214 of the functional reset count element 210 is arranged to receive the functional reset signal 114 via an OR gate 205, which receives the functional reset signal 114 at a first input 202 thereof, and an output 204 of which is operably coupled to the second input 214 of the functional reset count element 210.

The first input 212 of the functional reset count element 210 is operably coupled to an output 222 of a multiplexer element 220. A first data input 224 of the multiplexer element 220 is operably coupled to an output 232 of a subtraction element 230. A first input 234 of the subtraction element 230 is operably coupled to the output 216 of the functional reset count element 210, and as such is arranged to receive the value currently stored therein. A second input 236 of the subtraction element 230 is arranged to receive, in the illustrated example, a '1' value, and the subtraction element 230 is arranged to output 232 a value equal to the value received at the first input 234 thereof minus the value received at the second input 236 thereof. As such, the subtraction element 230 in the illustrated example is arranged to output a value one less than the value stored in the functional reset count element 210.

A second data input 226 of the multiplexer element 220 is operably coupled to an output 242 of a programmable register 240, which in the illustrated example is arranged to configurably store a threshold value. The programmable register 240 in the illustrated example is arranged to receive a threshold configuration signal 118, for example output by the processing core 110 in FIG. 1, and is arranged to configure the threshold value stored therein in accordance with the received threshold configuration signal 118. In this manner, software running on the processing core 110 is able to configure the threshold value stored within the programmable register 240. In some alternative examples, the programmable register may be pre-configured with a 'fixed' threshold value.

The multiplexer element 220 is arranged to selectively output one of the values received at the first and second inputs 224, 226 thereof in accordance with a signal received at a control input 228 thereof. Specifically in the illustrated example, the multiplexer element 220 is arranged to output the value received at the first input 224 thereof (i.e. the decremented value output by the subtraction element 230) upon receipt of a '0' value at the control input 228 thereof, and to output the value received at the second input 226 thereof (i.e. the threshold value output by the programmable register 240) upon receipt of a '1' value at the control input 228 thereof.

The control input 228 of the multiplexer element 220 is arranged to receive an initialisation signal 216. In this manner, upon the initialisation signal 216 being set to a '1' value, the multiplexer element 220 outputs the threshold value stored within the programmable register 240. The initialisation signal 216 is also provided to a second input 206 of the OR gate 205. Accordingly, upon the initialisation signal 216 being set to a '1' value, the functional reset count element 210 reads and stores the threshold value output by the multiplexer element 220; thereby (re-)initialising the reset controller 132.

Conversely, when the initialisation signal 216 is set to a '0' value, the multiplexer element 220 outputs the decremented value output by the subtraction element 230. In this manner, upon an active edge of the functional reset signal 114; i.e. upon detection of a functional reset event, the functional reset count element 210 reads, stores and outputs the decremented value. In this manner, whilst the initialisation signal 216 comprises a '0' value, each time an active edge occurs within the functional reset signal 114, i.e. each time a functional reset event is detected, the value stored within, and output by, the functional reset count element 210 is decremented. The output 216 of the functional reset count element 210 is provided to a first input 252 of a comparator 250. A second input 254 of the comparator 250 is arranged to receive a '0' value. The comparator element 250 is arranged to output, as the destructive reset signal 135, a '1' value when the signal received at the first input 252 thereof equals the signal received at the second input 254 thereof, and a '0' value otherwise. Thus, the comparator element 250 in the illustrated example outputs a '0' value whilst the value stored within and output by the functional reset count element 210 does not equal '0'. When the value stored within and output by the functional reset count element 210 equals '0', i.e. when the number of detected functional reset events equals the threshold value stored within the programmable register 240, the comparator element 250 outputs 135 a '1' value, indicating that a destructive reset is required.

Thus, the reset controller 130 in the illustrated example in effect comprises a counter arranged to decrement a value stored therein upon detection of a functional reset event, and to cause a destructive reset upon a number of detected functional reset events equalling a threshold value. The reset controller 130 may alternatively be arranged to increment a value stored therein upon detection of a functional reset event, and to cause a destructive reset upon a number of detected functional reset events equalling a threshold value. For example, the subtraction element 230 may be replaced with an addition element arranged increment the value stored within the functional reset count element 210, and the value stored within the programmable register 240 upon initialisation may be configured such that, upon the number of detected functional reset events equalling a desired threshold value, incrementing the value stored within the functional reset count element 210 causes the value stored therein to 'roll over' to '0'.

In this manner, a functional type of reset event may be escalated to the destructive type, for example in order to force a full system reset, upon the number of functional reset events detected equalling a (configurable) threshold value. Advantageously, by enabling such reset escalation within hardware, as illustrated in FIG. 1, the burden of preventing reset cycling may be substantially removed from software, thereby simplifying software development etc. Furthermore, in the illustrated example a user is able to configure the threshold value based on which a functional reset may be escalated to a destructive reset.

In the example illustrated in FIG. 2, the reset control module 132 further comprises a timer component 260. The timer 260 is arranged to receive at an input 262 thereof the functional reset signal 114, and to be initialised upon an active edge thereof; i.e. upon detection of a functional reset event. An output 264 of the timer 260 is operably coupled to the control input 228 of the multiplexer element 220 and the second input 206 of the OR gate 204. Specifically in the illustrated example, the output 264 of the timer 260 is operably coupled to a first input 272 of an OR gate 270, an output 274 of which is operably coupled to the control input 228 of the multiplexer 220 and the second input 206 of the OR gate 105. The timer 260 is arranged to output a '1' value upon expiration thereof. Thus, upon expiration of the timer 260, the reset controller 132 is re-initialised. In this manner, when functional reset events are detected over a long period of time, as may be the case in long run times within industrial applications, escalation to a destructive reset may be avoided through long term accumulation of function reset events.

A second input 276 of the OR gate 270 is arranged to receive an external initialisation signal 134, via which the reset controller 132 may be (re-)initialised. For example, and referring back to FIG. 1, the reset management module 130 in the illustrated example comprises an OR gate 136 comprising a plurality of inputs. An output of the OR gate 136 is operably coupled to the reset controller 132 and arranged to provide the initialisation signal to the second input of the OR gate 270 within the reset controller 132. In this manner, a '1' value received at any input of the OR gate 136 will (re-)initialise the reset controller 132. In the illustrated example, the OR gate 136 is arranged to receive at one input thereof the destructive reset signal 112. In this manner, the reset controller is re-initialised following a destructive reset. A further input of the OR gate 136 is arranged to receive a software configurable initialisation signal 116. In this manner, software running on the processing core 110 is able to re-initialise the reset controller 132. A still further input of the OR gate 136 is arranged to receive a power-on indication signal 138. In this manner, the reset controller 132 is initialised following power-on of the microprocessor device 100.

Figure 3:
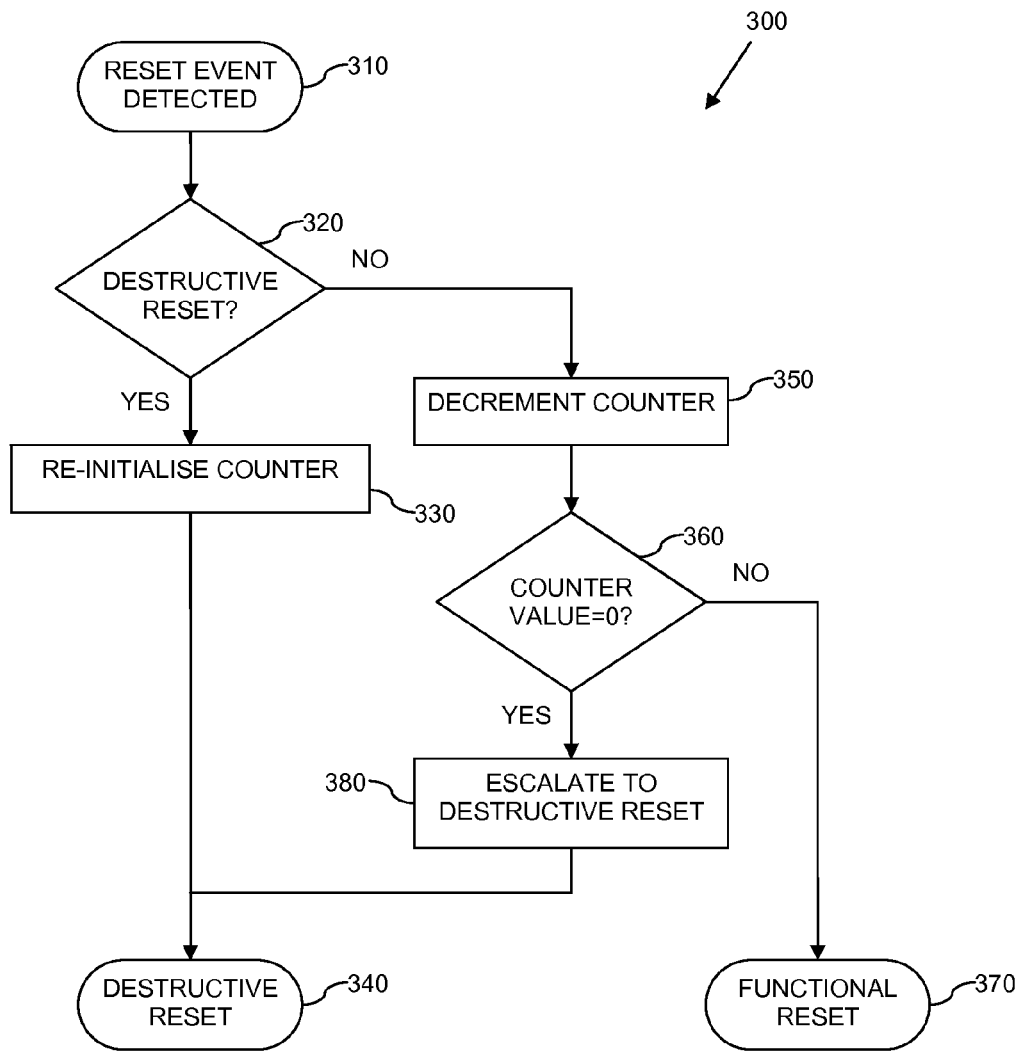
FIG. 3 illustrates a simplified flowchart of an example of a method of managing reset events.

Referring now to FIG. 3, there is illustrated a simplified flowchart 300 of an example of a method of managing reset events within a microprocessor device, such as may be implemented within the microprocessor device 100 of FIG. 1. The method starts at 310 with the detection of a reset event, and moves on to 320. If the detected reset event comprises a destructive reset event, the method moves on to 330 where a counter is re-initialised. A destructive reset is then initiated at 340. Referring back to 320, if the detected reset event comprises a non-destructive (e.g. functional) reset event, the method moves on to 350 where the counter is, in the illustrated example, decremented. Next, at 360, it is determined whether the counter value equals '0'. If the counter value does not equal '0', the method moves on to 370 and a functional reset is initiated. Conversely, if the counter value does equal '0', the method moves on to 380 where the reset event is escalated to a destructive reset event, and the method moves on to 340 where a destructive reset is then initiated.

Figure 4:
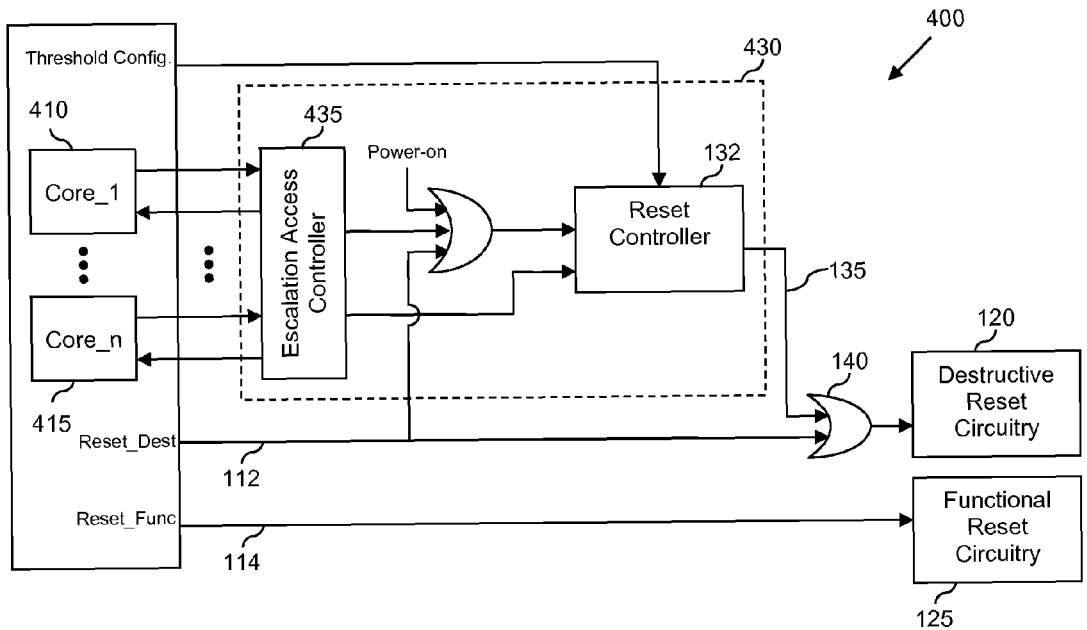
FIG. 4 illustrates a simplified block diagram of an alternative example of a part of a microprocessor device.

Referring now to FIG. 4, there is illustrated a simplified block diagram of an alternative example of a part of a microprocessor device 400. In the example illustrated in FIG. 4, the microprocessor device 400 comprises multiple processing cores 410, 415. In the illustrated example, the microprocessor device 400 comprises n processing cores, where n may comprise two or more. The microprocessor device 400 comprises reset circuitry 125 arranged to perform a first level (functional) reset of at least some components within the microprocessor device 400 upon a functional reset signal 114 indicating the detection of a functional (non-destructive) reset event. The microprocessor device 400 further comprises reset circuitry 120 arranged to perform a first level (destructive) reset of components within the microprocessor device 400, such as a complete reset of the entire microprocessor device 400, upon a destructive reset signal 112 indicating the detection of a destructive reset event. Thus, the destructive reset circuitry 120 is arranged to perform a more extensive reset and the functional reset circuitry 125 is arranged to perform a less extensive reset.

The microprocessor device 400 further comprises a reset management module 430. The reset management module 430 is arranged to detect a reset event comprising a first reset level, determine if at least one reset condition has been met upon detection of the reset event, and cause a reset of a second reset level upon determining that the at least one reset condition has been met. In particular for the example illustrated in FIG. 4, the reset management module 430 comprises a reset controller 132 arranged to receive indications of a functional reset event (as described in greater detail below). The reset controller 132 is further arranged to output a destructive reset signal 135 to be received by the destructive reset circuitry 120. In the illustrated example, the destructive reset signals 112, 135 are provided to the destructive reset circuitry 120 via an OR gate 140. In this manner, if either of the destructive reset signals 112, 135 comprises, in the illustrated example, a '1' value (indicating that a destructive reset is to be performed) the destructive reset circuitry 120 will perform a destructive reset. Upon detection of a functional reset event, the reset controller 132 illustrated in FIG. 4 is arranged to determine if at least one reset condition has been met, and if the reset condition(s) has/have been met, to output a '1' indicating to the destructive reset circuitry 120 that a destructive reset is required. In the manner, upon determining that the reset condition(s) has/have been met, the reset management module 430 may be arranged to cause a destructive reset. Thus, the reset controller 132, and thereby the reset management module 430, may be arranged to escalate a functional reset to a destructive reset upon the one or more reset conditions being met (for example as described in greater detail above).

The reset management module 430 illustrated in FIG. 4 further comprises an escalation access controller 435 arranged to receive requests to update the reset controller 132, and to perform arbitration of such received requests. Such requests may comprise, by way of example, requests to indicate a functional reset event, requests to re-initialise the reset controller 132, etc. In the illustrated example, the escalation access controller 435 is arranged to receive requests to update the reset controller 132 from the processing cores 410, 415, and thus to perform arbitration of update requests from the plurality of processing cores 410, 415. For example, upon receipt of a request to update the reset controller 132 from a first processing core 410, the escalation access controller 435 may be arranged to provide an indication of the received request to update the reset controller 132 to at least one further processing core 415, and to update the reset controller 132 upon receipt of confirmation of the update from the at least one further processing core 415. In some examples, the escalation access controller 435 may be arranged to only update the reset controller 132 upon receipt of confirmation of the update from all further processing cores 415.

In some examples, the indication provided to the further processing core(s) 415 may comprise a simple indication (e.g. a '1' value) that a request to update the reset controller 132 has been received, and confirmation from the further processing core(s) 415 may similarly comprise a simple response, such as a '1' value. In some examples, the escalation access controller 435 may be arranged to only update the reset controller 132 upon receipt of confirmation of the update from the further processing core(s) 415 within a limited period of time.

In some alternative examples, a request to update the reset controller 132 received from a first processing core 410 may comprise an access key. The indication of the received request to provided by the escalation access controller 435 to the further processing core(s) 415 may thus comprises the access key received from the first processing core 410, and the escalation access controller 435 may be arranged to only update the reset controller 132 upon receipt of confirmation of the update from the further processing core(s) 415 comprising the respective access key.

Thus, in this manner, arbitration may be provided between requests to update reset controller (e.g. to indicate a functional reset event or to re-initialise the reset controller 132) received from different processing cores 410, 415 within a multi-processor architecture.

Figure 5:
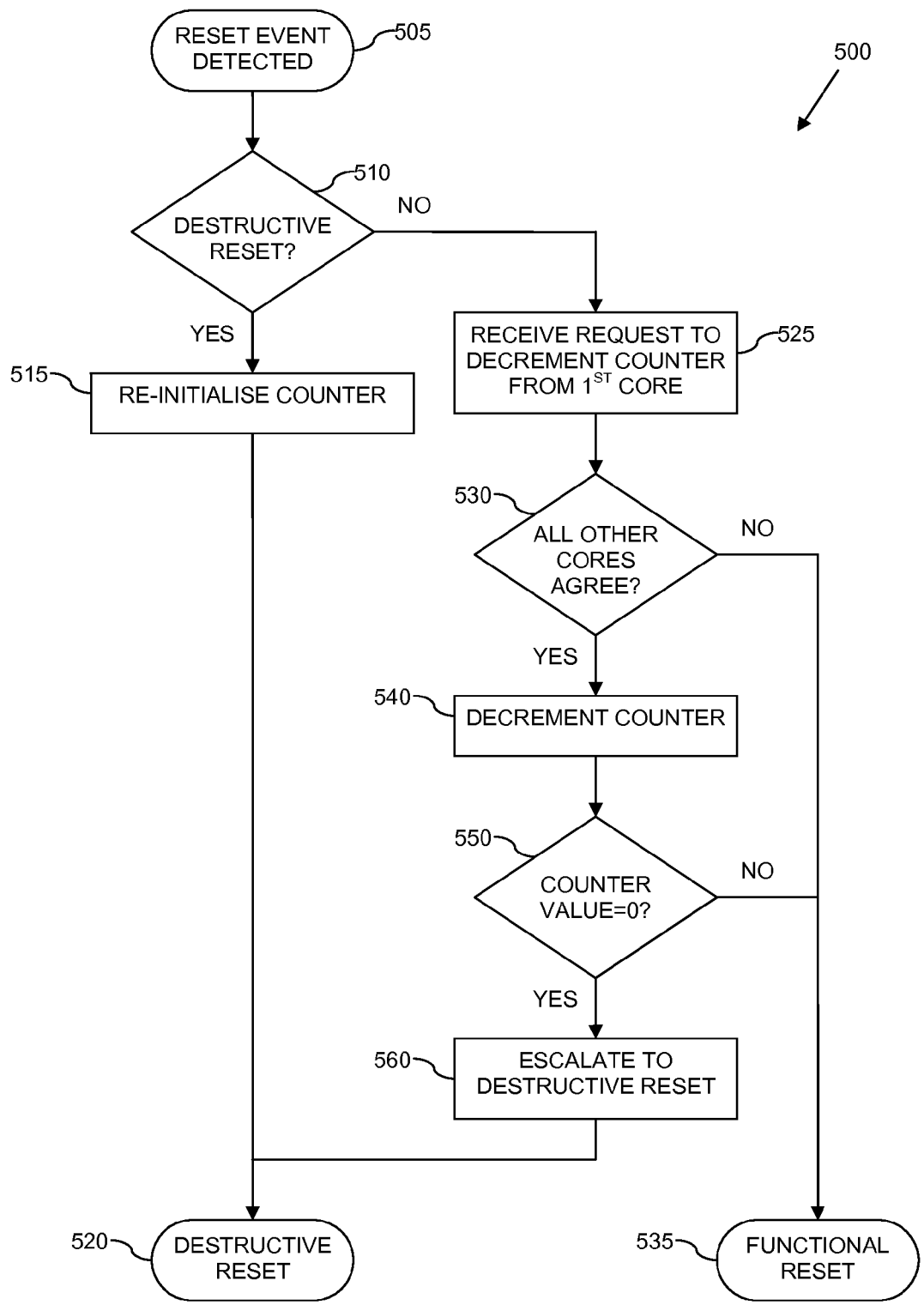
FIG. 5 illustrates a simplified flowchart of an alternative example of a method of managing reset events.

Referring now to FIG. 5, there is illustrated a simplified flowchart 500 of an alternative example of a method of managing reset events within a microprocessor device, such as may be implemented within the microprocessor device 400 of FIG. 4. The method starts at 505 with the detection of a reset event, and moves on to 510. If the detected reset event comprises a destructive reset event, the method moves on to 515 where a counter is re-initialised. A destructive reset is then initiated at 520. Referring back to 510, if the detected reset event comprises a non-destructive (e.g. functional) reset event, for example where the reset event is detected by way of request to update a counter received from a first processing core, the method moves on to 525 where an indication of a request to update a counter is provided to other processing cores. If, at 530, one or more processing cores to not confirm/agree to the updating of the counter, the method moves on to 535 and a functional reset is initiated. Conversely, if all other processing cores confirm/agree to updating of the counter, the method moves on to 540 where the counter is, in the illustrated example, decremented. Next, at 550, it is determined whether the counter value equals '0'. If the counter value does not equal '0', the method moves on to 535 and a functional reset is initiated. Conversely, if the counter value does equal '0', the method moves on to 560 where the reset event is escalated to a destructive reset event, and the method moves on to 520 where a destructive reset is then initiated.

In the examples hereinbefore described, the reset management module 130, 430 has been arranged to detect reset events comprising a less extensive reset level (e.g. functional reset events), determine if at least one reset condition has been met (e.g. a number of detected reset events equals a threshold value), and cause a reset of a more extensive reset level (e.g. a destructive reset level) upon determining that the at least one reset condition has been met.

It is contemplated that such a reset management module may additionally/alternatively be arranged to detect reset events comprising a more extensive reset level (e.g. destructive reset events), determine if at least one reset condition has been met, and cause a reset of a less extensive reset level (e.g. a functional reset level) upon determining that the at least one reset condition has been met. In this manner, a similar mechanism for stopping destructive reset cycling may be provided by staying in reset after, say, n destructive resets have been detected until a power-down-and-up of the microprocessor device is performed.

Figure 6:
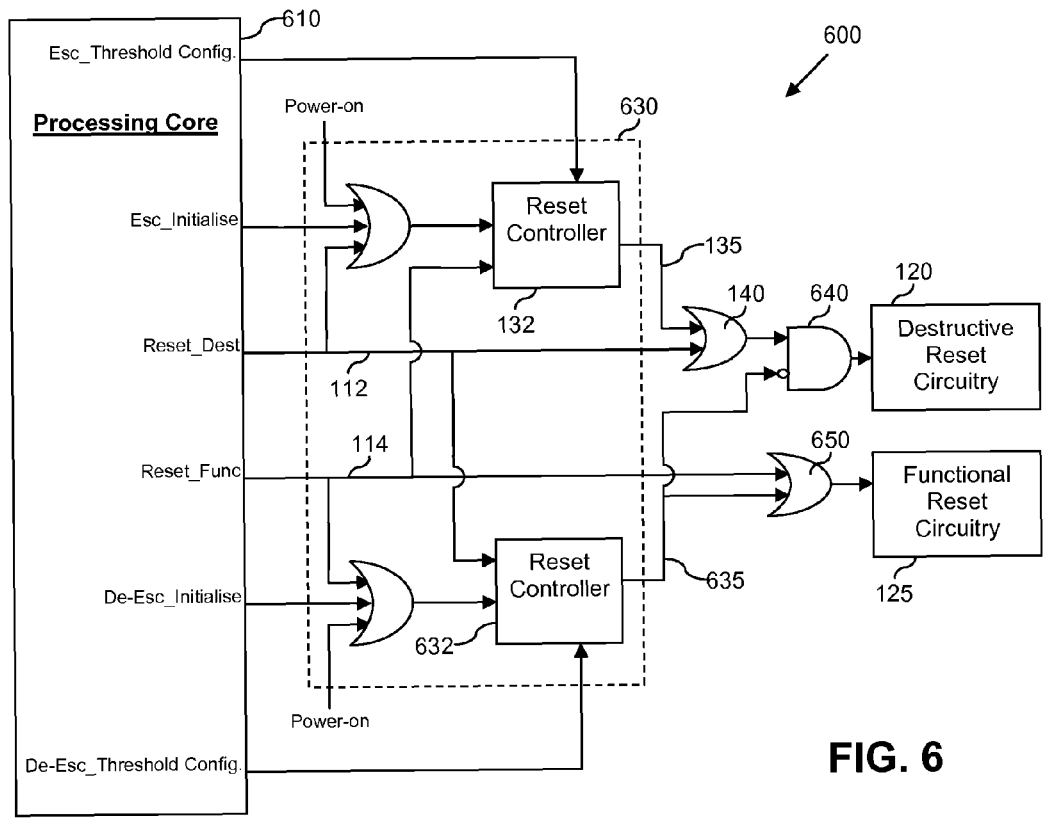
FIG. 6 illustrates a simplified block diagram of an alternative example of a part of a microprocessor device.

For example, and as illustrated in FIG. 6, there is illustrated a simplified block diagram of an alternative example of a part of a microprocessor device 600. In the example illustrated in FIG. 6, the microprocessor device 600 comprises a processing core 610. The microprocessor device 600 further comprises reset circuitry 125 arranged to perform a first level (functional) reset of at least some components within the microprocessor device 600 upon a functional reset signal 114 indicating the detection of a functional (non-destructive) reset event. The microprocessor device 600 further comprises reset circuitry 120 arranged to perform a first level (destructive) reset of components within the microprocessor device 600, such as a complete reset of the entire microprocessor device 600, upon a destructive reset signal 112 indicating the detection of a destructive reset event. Thus, the destructive reset circuitry 120 is arranged to perform a more extensive reset and the functional reset circuitry 125 is arranged to perform a less extensive reset.

The microprocessor device 600 further comprises a reset management module 630. The reset management module 630 comprises a first reset controller 132 arranged to receive the functional reset signal 114, and thereby to detect a functional reset event. The first reset controller 132 is further arranged to output a destructive reset signal 135 to be received by the destructive reset circuitry 120. In the illustrated example, the destructive reset signals 112, 135 are provided to the destructive reset circuitry 120 via an OR gate 140. In this manner, if either of the destructive reset signals 112, 135 comprises, in the illustrated example, a '1' value (indicating that a destructive reset is to be performed) the destructive reset circuitry 120 will perform a destructive reset. Upon detection of a functional reset event, as indicated by the functional reset signal 114, the reset first controller 132 is arranged to determine if at least one reset condition has been met (e.g. if a number of detected functional reset events equals a threshold value), and if the reset condition(s) has/have been met, to output a '1' indicating to the destructive reset circuitry 120 that a destructive reset is required. In the manner, upon determining that the reset condition(s) for detected functional reset events has/have been met, the reset management module 130 is arranged to cause a destructive reset. Thus, the first reset controller 132, and thereby the reset management module 130, is arranged to escalate a functional reset to a destructive reset upon the one or more reset conditions being met.

The reset management module 630 further comprises a second reset controller 632 arranged to receive the destructive reset signal 112, and thereby to detect a destructive reset event. The second reset controller 632 is further arranged to output a functional reset signal 635 to be received by the functional reset circuitry 125. In the illustrated example, the functional reset signals 114, 635 are provided to the functional reset circuitry 125 via an OR gate 650. In this manner, if either of the functional reset signals 114, 635 comprises, in the illustrated example, a '1' value (indicating that a functional reset is to be performed) the functional reset circuitry 125 will perform a functional reset. Upon detection of a destructive reset event, as indicated by the destructive reset signal 112, the second reset controller 632 is arranged to determine if at least one reset condition has been met (e.g. if a number of detected destructive reset events equals a threshold value), and if the reset condition(s) has/have been met, to output a '1' indicating to the functional reset circuitry 120 that a functional reset is required. In the manner, upon determining that the reset condition(s) for detected destructive reset events has/have been met, the reset management module 130 is arranged to cause a functional reset. In the example illustrated in FIG. 6, the output of OR gate 140 is operably coupled to the destructive reset circuitry 120 via AND gate 640. The functional reset signal 635 output by the second reset controller 632 is provided to an inverting input of the AND gate 640. In this manner, when the function reset signal 635 is set to a '1' value to indicate that a functional reset is required, the destructive reset signal 112 is isolated from the destructive reset circuitry 120 to prevent a destructive reset being performed. Thus, the second reset controller 632, and thereby the reset management module 130, is arranged to de-escalate a destructive reset to a functional reset upon the one or more destructive reset conditions being met.

Thus, a method and apparatus for enabling reset events to escalated or de-escalated have been described. In particular, a method and apparatus of configurably and flexibly enabling such (de-)escalation of reset events have been described. In addition, enabling such escalation of reset events allows reset events that would be configured as destructive events in a 'fixed' reset level system, to be initially configured as non-destructive (e.g. functional) reset events. Such reset events may subsequently be escalated to destructive events upon one or more reset criteria being met (e.g. such events occur more than n times). In this manner, system availability may be improved by initially avoiding destructive resets, with functional safety subsequently being provided by escalating the reset level for such reset events upon one or more reset criteria being met.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated examples the destructive and functional reset circuits 120, 125 have been illustrated as separate logical blocks. However, it will be appreciated that the destructive and functional reset circuits 120, 125 have one or more common components, and/or may comprise a single functional component.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A microprocessor device, comprising:
   multiple processing cores;
   at least one reset management module arranged to:
      detect a reset event comprising a first reset level;
      determine if at least one reset condition has been met upon detection of the reset event comprising the first reset level; and
      cause a reset of a second reset level upon determining that the at least one reset condition has been met,
   the at least one reset management module comprising an access controller arranged to:
      receive, from the processing cores, requests to update a counter of the at least one reset management module; and
      perform arbitration of received requests to update the counter.

2. The microprocessor device of claim 1, wherein the at least one reset management module comprises at least one reset controller comprising the counter, and the at least one reset controller is arranged to:
   increment/decrement a value of the at least one counter upon detection of a reset event comprising the first reset level; and
   cause a reset of a second reset level upon a number of detected functional reset events equalling a threshold value.

3. The microprocessor device of claim 2, wherein the threshold value is configurable.

4. The microprocessor device of claim 2, wherein the at least one reset controller comprises at least one timer, and the at least one reset controller is arranged to:
   initialise the at least one timer upon detection of a reset event comprising the first reset level; and
   re-initialise the at least one counter upon expiry of the at least one timer.

5. The microprocessor device of claim 2, wherein the at least one reset management module is arranged to re-initialise the at least one counter upon at least one from a group comprising at least one of:
   receiving a software generated re-initialise signal;
   detecting a reset event comprising the second reset level; and
   powering up of the microprocessor device.

6. The microprocessor device of claim 1, wherein the access controller is arranged to, upon receipt of a request to update the counter from a first processing core:
   provide an indication of the received request to update the counter to at least one further processing core; and
   to update the counter upon receipt of confirmation of the update from the at least one further processing core.

7. The microprocessor device of claim 6, wherein the request to update the counter received from the first processing core comprises an access key.

8. The microprocessor device of claim 7, wherein the indication of the received request to update the counter provided by the access controller to the at least one further processing core comprises the access key received from the first processing core.

9. The microprocessor device of claim 6, wherein the access controller is arranged to update the counter upon receipt of confirmation of the update from all further processing cores.

10. The microprocessor device of claim 1, wherein the at least one reset management module is arranged to:
    detect a reset event comprising a less extensive reset level;
    determine if at least one reset condition has been met upon detection of the reset event comprising the less extensive reset level; and
    cause a reset of a more extensive reset level upon determining that the at least one reset condition has been met.

11. The microprocessor device of claim 10, wherein the more extensive reset level comprises a destructive reset level and the less extensive reset level comprises a non-destructive reset level.

12. The microprocessor device of claim 1, wherein the at least one reset management module is arranged to:
    detect a reset event comprising a more extensive reset level;
    determine if at least one reset condition has been met upon detection of the reset event comprising the more extensive reset level; and
    cause a reset of a less extensive reset level upon determining that the at least one reset condition has been met.

13. The microprocessor device of claim 1 implemented as an integrated circuit device comprising at least one die within a single integrated circuit package.

14. A method of managing reset events within a microprocessor device, the method comprising:
- detecting a reset event comprising a first reset level;
- determining if at least one reset condition has been met upon detection of the reset event comprising the first reset level;
- causing a reset of a second reset level upon determining that the at least one reset condition has been met;
- receiving, at an access controller from multiple processing cores, requests to update a counter; and
- performing arbitration of received requests to update the counter.

15. The method of claim 14, further comprising:
- receiving a request to update the counter from a first processing core;
- providing an indication of the received request to update the counter to at least one further processing core; and
- updating the counter upon receipt of confirmation of the update from the at least one further processing core.

16. The method of claim 15, wherein the request to update the counter received from the first processing core comprises an access key.

17. The method of claim 16, wherein the indication of the received request to update the counter provided by the access controller to the at least one further processing core comprises the access key received from the first processing core.

18. The method of claim 15, further comprising:
- updating, by the access controller, the counter upon receipt of confirmation of the update from all further processing cores.

19. The method of claim 14, further comprising:
- detecting a reset event comprising a less extensive reset level;
- determining if at least one reset condition has been met upon detection of the reset event comprising the less extensive reset level; and
- causing a reset of a more extensive reset level upon determining that the at least one reset condition has been met.

20. The method of claim 14, further comprising:
- detecting a reset event comprising a more extensive reset level;
- determining if at least one reset condition has been met upon detection of the reset event comprising the more extensive reset level; and
- causing a reset of a less extensive reset level upon determining that the at least one reset condition has been met.

* * * * *